July 22, 1969　　　　　F. R. COE　　　　　3,456,416
MEASUREMENT OF GASES IN METALS
Filed Aug. 6, 1965　　　　　　　　　　　　　2 Sheets-Sheet 1
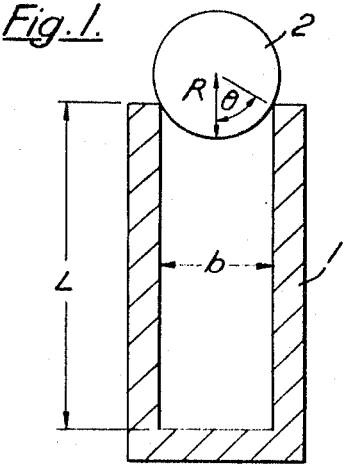
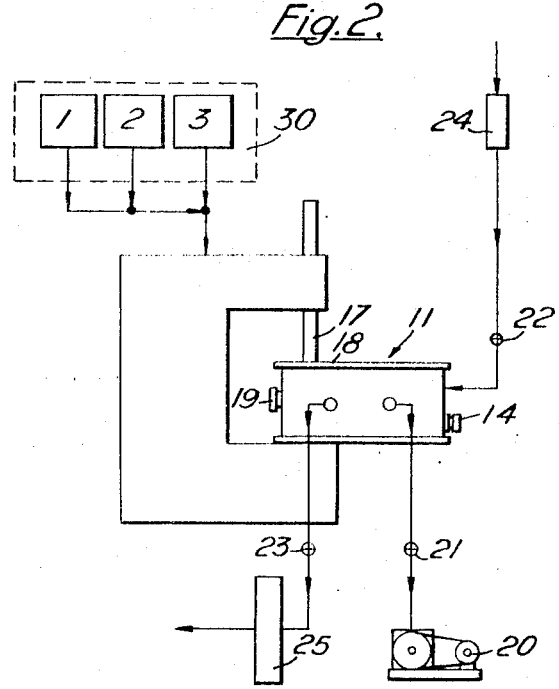

United States Patent Office 3,456,416
Patented July 22, 1969

3,456,416
MEASUREMENT OF GASES IN METALS
Frank R. Coe, Stapleford, England, assignor to
The Welding Institute
Filed Aug. 6, 1965, Ser. No. 477,770
Claims priority, application Great Britain, Aug. 11, 1964,
32,688/64
Int. Cl. B65b 31/02; F17c 1/00, 13/06
U.S. Cl. 53—8        2 Claims

ABSTRACT OF THE DISCLOSURE

To prepare a hydrogenated metal specimen from which the hydrogen can be obtained by diffusion from the metal in its atomic form, hollow metal container and self-locating lid defining a precise internal container volume are vacuum heat-treated to remove occluded atomic hydrogen and the lid is then resistance-welded to the container body in an atmosphere of hydrogen in its molecular form. The hydrogen can subsequently be recovered by heating to a temperature at which the hydrogen dissociates into its atomic form and diffuses through the walls of the container.

---

It is of considerable practical importance, for example in the welding industry, to know with reasonable accuracy the quantity for gas occluded in a metal and which will be evolved when the metal is heated. Several different systems have been developed for the purpose of determining this quantity from specimen samples of metal but difficulty arises in the interpretation of the results owing to the lack of a suitable synthetic sample for use as a primary standard with which a system may be calibrated or a particular test compared. For example, considering the specific case of determining the quantity of hydrogen in a ferritic steel specimen, repeated analyses by one operator in one laboratory using one apparatus rarely, if ever, show the precision that would normally be considered essential in quantitative chemical analysis and even greater discrepancies are revealed when results of different operators using either the same or different methods are compared. There is reason to believe that the analytical estimation of hydrogen itself can be carried out with a high degree of precision because of the inherent sensitivity of the detection methods used. We have developed an apparatus, described in U.S. Patent No. 3,176,500 which makes an important step towards solving the problem of absolute apparatus calibration in that it includes means for injecting a measured volume of pure hydrogen gas to calibrate the instrument response. However, this arrangement is only directly applicable to systems employing carrier gas methods of analysis and not to systems employing vacuum techniques and, furthermore, it is a fundamental requirements of calibration techniques that the actual experimental conditions existing during an analysis should be simulated as nearly as possible during a calibration operation. For example, when a hydrogen in steel determination is to be calibrated, it is generally recognized that the presecence of a steel specimen is desirable during calibration to compensate for matrix effects and possible side reactions. Thus, considering this particular example, only by using a steel specimen out of which a known amount of hydrogen is extracted can one begin to simulate routine practice and investigate the possible accuracy of a method for determining the quantity of hydrogen evolved by steel specimens. Preparation of specimens artificially hydrogenated to a predetermined level has been suggested but it is not easy using thermal, pressure or electrolytic techniques. Furthermore, storage of the resulting samples is a problem owing to the fact that the hydrogen has to be in its dissociated atomic form to dissolve in the metal and though hydrogen has a very low solubility at normal temperatures, it still has appreciable diffusivity in its dissociated form necessitating that specimens be stored at very low temperatures, for example in liquid nitrogen at −196° C. in order to "fix the hydrogen in the dissociated form.

According to the present invention, a standard gas specimen is not contained within the metal itself but instead is enclosed in its molecular form in a hollow, hermetically sealed metal container which has predetermined internal volume and is substantially free from occluded gas. Since the gas is in its molecular state, and its degree of dissociation at room temperature is, for all practical purposes, zero, it will have substantially no tendency to diffuse into the metal, enabling such specimens to be stored almost indefinitely at room temperature. However, if such a specimen is heated to a temperature corresponding to that used in the normal analysis of a metallic sample, a small but significant proportion of the molecular gas will be dissociated to the atomic form and will thus be free to dissolve in and diffuse through the metal walls of the sealed container thereby enabling more molecular gas to be dissociated. This outward diffusion will continue as long as the high temperature is maintained and at the same time a concentration gradient exists through the wall thickness to provide the driving force, a condition provided by all analytical procedures which relay on maintaining a zero partial pressure of the evolved gas at the specimen surface by continual removal of that gas, whether by means of vacuum pumps or inert carrier gas streams.

Preferably the metal of the container is the one for which the subsequent analysis is proposed in order to simulate experimental conditions as closely as possible but, in cases where this would not be convenient, a different metal may be used.

According to a further aspect of the present invention, a standard gas specimen comprising a hermetically sealed container enclosing a predetermined quantity of gas in its molecular form, is prepared by: firstly, vacuum heat treating a hollow metal container having a predetermined internal volume and a closing member for the container to remove all traces of occluded gas and subsequently hermetically sealing the container in an atmosphere containing a predetermined pressure of the gas to be enclosed by welding the closing member to the container by means of a resistance welding process.

Preferably the atmosphere in which the container is sealed, and thus the gas enclosed in the specimen, consists entirely of the gas under study in the system to be calibrated by the standard specimen and the pressure is substantially equal to atmospheric pressure to reduce the possibility of air leaks in the chamber in which the welding is carried out. Normally the quantity of gas enclosed in the specimen is determined by a suitable choice of volume of the container but, if desired, the quantity of active gas enclosed in the specimen may be reduced, while the preferred atmospheric pressure condition is maintained, by diluting the active gas with an inert gas which would show no tendency to diffuse through the metal walls of the container at the temperature to which the specimen is to be subjected in calibration experiments.

A method embodying the present invention enables a specimen to be prepared enclosing a precisely controlled, reproducible amount of molecular gas which will remain there substantially indefinitely at room temperature but which will be quantitatively released, either itself or after thermal decomposition, when the specimen is heated in any type of apparatus designed for gas determination. Such a specimen fulfils the requirements of a "primary" specimen since the quantity of enclosed gas is determined independently of the techniques used subsequently to analyse samples and therefore the specimen may be employed in any laboratory to check the correct functioning of the particular gas determining apparatus and to separate errors due to the analytical determination itself from those arising from the lack of control in preparation of specimens for routine gas in metal analysis.

As previously mentioned, particular problems are presented in connection with the commerically important determination of hydrogen in steel owing to the appreciable diffusivity of dissociated hydrogen at room temperatures. In order that the invention may be more clearly understood a method embodying the present invention for manufacturing standard specimens of hydrogen in steel containers and the preferred features of such specimens will now be described, by way of example, with reference to the accompanying drawings; in which:

FIGURE 1 is a diagrammatic section through a specimen embodying the present invention in connection with which the preferred relative dimensions of the container and closing member will be described;

FIGURE 2 is a general view of an apparatus for filling and sealing specimens shown in FIGURE 1;

Figure 3:
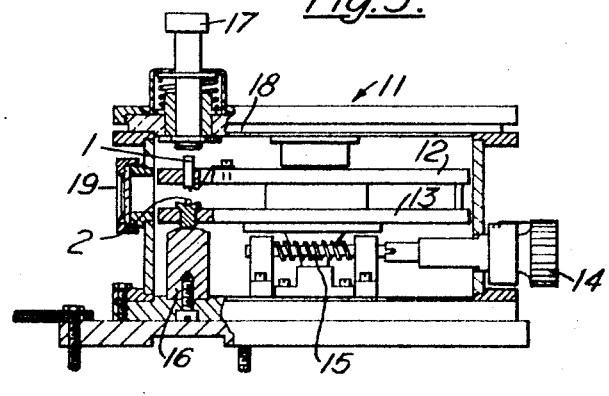
FIGURE 3 is a section through the welding chamber of the apparatus of FIGURE 2.

In order to seal a precisely known volume of hydrogen in a steel specimen two important conditions must be satisfied. Firstly it must be possible to determine precisely and simply the exact volume of gas enclosed. Secondly the sealing operation must be such that none of the enclosed hydrogen can be lost either before, during or after the operations.

The first condition is achieved by using a steel specimen with a carefully machined and measured cavity and provided with an equally carefully prepared lid. Thus the physical volume of the cavity can be established with a high degree of confidence. In a method embodying the present invention for preparing such a hydrogen specimen, the second condition is achieved by employing a resistance welding technique which relies on the resistance heating effect of electric current to produce a fusion weld between two components.

FIGURE 1 illustrates the preferred geometrical arrangement of a specimen both from the welding and analytical standpoints. The specimen consists of a cylinder 1 with a blind cylindrical hole and a spherical ball lid 2 constituting a closing member. In place of the spherical lid, a flat lid could be used although it would require extra machine preparation and would not have the advantage of the spherical lid of being self-locating into the bore of the specimen without additional edge preparation. The body portion 1 of the specimen is manufactured from low carbon mild steel but the lid, for convenience, is a stainless steel ball since these, unlike low carbon ferritic balls, are readily available to the required tolerances.

The internal physical volume of the specimen illustrated in FIGURE 1 is given by:

$$V = \frac{b^2 L}{4} - \pi \int_{x=R}^{x=R\cos\theta} (R^2 - x^2) dx$$

where $R$, $b$, $L$ and $\theta$ represent the dimensions shown in FIGURE 1. After integration this equation reduces to:

$$V = \frac{\pi b^2 L}{4} - \frac{\pi R^3}{3}(\cos^3\theta - 3\cos\theta + 2)$$

while $\theta$, $b$ and $R$ are related by:

$$\sin\theta = b/2R$$

For optimum welding conditions angle $\theta$ of FIGURE 1 lies between 45° and 60° so that the choice of values for $b$ and $R$ is to some extent limited. The value of $R$, the radius of the spherical lid, is determined by the various sizes in which precision balls are commercially available while values for $b$, the bore of the body member 1, of the specimen, may be chosen from normal drill sizes. The required internal volume V can then be selected by varying the depth L of the internal cavity of the body member 1. Using conventional drilling methods, the bore of the internal cavity of the body member 1 may be machined to a tolerance of ±0.001 inch and the depth of this cavity to a tolerance of ±0.005 inch. In order to cover a representative range of specimen sizes and hydrogen concentrations a series of standards are required. The most suitable overall dimensions for most applications appear to be 1 inch by ½ inch diameter and 1 inch by ¼ inch diameter. Within each size different hydrogen concentrations may be employed.

Before use, the body members of the specimens and the lids are vacuum heat treated together by heating to a temperature at least equal to that which will be employed in the subsequent analysis for a long period, for example over night, in order to ensure that they are thoroughly degassed. A reasonable supply, for example 100 specimens and lids, may be degassed in a single process and may then be stored in a desiccator until needed. Tweezers are used for handling the specimens after degassing in order to preserve the specimen from all traces of grease.

Figure 4:
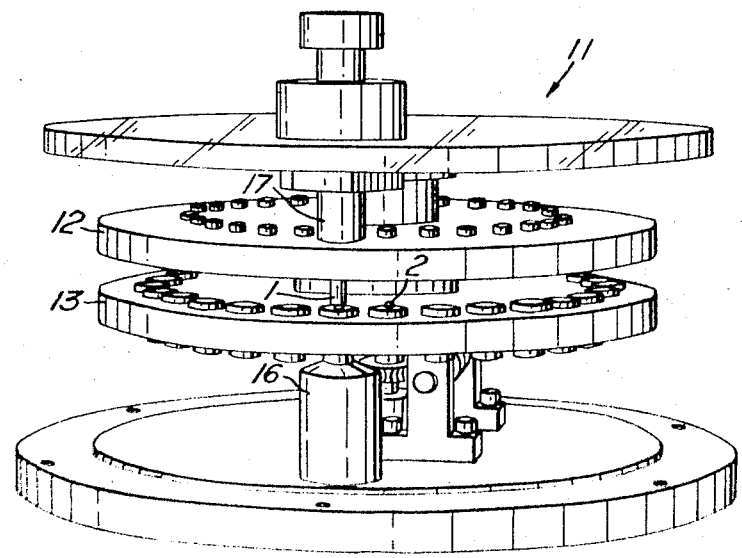
FIGURE 4 is a diagrammatic perspective view of the chamber, with parts broken away, showing the electrodes in their operative position.

A general view of the chamber in which the filling of the specimen and resistance welding of the closing member to the body member is carried out is shown in FIGURE 2 while FIGURES 3 and 4 show respectively a section through the welding chamber and a diagrammatic perspective view with parts broken away for clarity showing a batch of specimens. After degassing, body members and lids to form a batch of specimens are loaded into the welding chamber 11. As shown in FIGURES 3 and 4, the welding chamber 11 includes circular twin tables 12 and 13 for receiving equal numbers of body members and lids respectively in such positions that each body member is in precise register with a lid. The tables 12 and 13 are of a non-conducting plastic material and are arranged to rotate in synchronism in response to manual operation of an indexing knob 14 which passes through an O-ring seal in a wall of the chamber 11 and drives a worm gear 15 to rotate the tables. The tables are so arranged that successive indexing movements move successive body member and lid pairs into a welding position between an earthed lower electrode 16, which is integral with the base of the chamber 11, and a live upper electrode 17 which is spring loaded and operates through an O-ring seal in the transparent lid 18 of the chamber, formed of Perspex for example. A port 19, also fitted with a transparent window, is provided for viewing the arrangement within the chamber 11.

When a batch of specimens and lids has been loaded into the chamber 11 and the lid 18, which also is sealed by means of an O-ring, replaced, the chamber 11 is evacuated by means of a rotary vacuum pump 20. When evacuation is complete, an on/off valve 21 in the outlet from the chamber 11 to the vacuum pump 20 is closed and valves 22 and 23, connected respectively with a hydrogen supply and outlet, are opened so that hydrogen may be supplied to the chamber from a cylinder through a purifier 24 which serves to remove contaminating oxygen from the gas. A pressure measuring device 25 is provided for indicating the pressure of hydrogen in the chamber. A steady flow of hydrogen is allowed to pass through the system for a short time to ensure complete removal of air and the gas is burnt to waste after leaving the pressure measuring device 25, which may for example be a water manometer. Means are also provided for measuring the temperature of the flowing hydrogen so that the mass of gas enclosed by the specimen after sealing may be calculated accurately from a knowledge of the precise volume, pressure and temperature at the instant of sealing.

As previously mentioned, in the preferred arrangement, the gas in the chamber, and thus enclosed in the sealed specimen, is at substantially atmospheric pressure but, in practice, a slight positive pressure of hydrogen is maintained. When steady conditions are achieved, welding is carried out automatically as follows. A lid and body member pair are lined up to be in position between the lower and upper electrodes 16 and 17 within the chamber and the upper electrode is moved down under the control of unit 30 which serves to control, in a well known manner, the load applied by the upper electrode, the current applied during subsequent welding and the time for which the pressure welding current is applied. The value of the load, the magnitude of the welding current and the time for which pressure and current are applied are governed by the geometry of the weld arrangement, the work material and the electrode properties, contact resistances and the type of weld joint required. However, these factors may be determined easily by experiment with reference to the particular welding conditions. Normally, a mechanical seal is formed between the body member and closing member arranged beneath it in the welding chamber as soon as the load is applied by lowering of the upper electrode 17. The weld cycle is completed in 40 to 100 milliseconds depending on the dimensions and there is substantially no risk of losing hydrogen in this time. Although a setdown of a few thousandths of an inch results from welding, the gas volume enclosed is determined by the physical volume at the instant load is applied. After the weld cycle, the upper electrode 17 is raised automatically and the tables 12 and 13 moved round by operation of the manual indexing knob 14 so that the next specimen is in a position for welding. We believe that the speed at which the resistance welding operation may be carried out is an important feature of the present invention. If an arc welding method were employed for example, such as a shielded tungsten arc method, the material to be welded would need to be maintained at a high temperature for a considerably longer period and there would be a real possibility of hydrogen being absorbed, even through the shield or from within the specimen.

In the arrangement illustrated, the spherical lids are arranged on supports in the lower indexing table of the chamber and the body members are held by springs in the upper table each in register with a lid. However, if desired, the opposite arrangement could be employed with the lids supported, magnetically for example, by the upper table.

After preparation, specimens are stored in a desiccator until required for use so that surface contamination may be avoided.

I claim:
1. A method for preparing and using a standard hydrogenated metal specimen comprising a hermetically sealed container enclosing a predetermined quantity of hydrogen in the molecular form thereof, including the steps of removing all traces of the occluded gas by vacuum heat-treating a hollow metal container having a predetermined internal volume and a closing member for the container, hermetically sealing the container in an atmosphere containing a predetermined pressure of the hydrogen to be enclosed by welding the closing member to the container by means of a resistance welding process, raising the temperature of the container to cause the hydrogen to dissociate into the atomic form thereof to dissolve into the metal specimen and to diffuse through the walls of the specimen, and recovering the evolved hydrogen from the outer surface of the specimen walls.

2. A method according to claim 1, in which the pressure of the atmosphere in which the welding is carried out is maintained substantially equal to atmospheric pressure.

References Cited
UNITED STATES PATENTS

| | | | |
|---|---|---|---|
| 2,435,747 | 2/1948 | Larson | 53—8 |
| 3,178,864 | 4/1965 | Anderson et al. | 53—7 X |

TRAVIS S. McGEHEE, Primary Examiner

U.S. Cl. X.R.

53—83; 206—.6